March 2, 1965 R. J. COLAO ETAL 3,171,980

DYNAMIC MEMORY CIRCUIT

Filed March 23, 1962

INVENTORS
RALPH J. COLAO
PAUL M. LEVY

BY

ATTORNEY.

3,171,980

DYNAMIC MEMORY CIRCUIT

Ralph J. Colao, White Plains, and Paul M. Levy, New Rochelle, N.Y., assignors to General Precision, Inc., a corporation of Delaware Filed Mar. 23, 1962, Ser. No. 181,870
2 Claims. (Cl. 307—88.5)

This invention relates generally to memory circuits and particularly to dynamic memory circuits such as those widely used in digital computers and data processors.

Memory circuits usually comprise a number of units, each of which is connected to a series of regularly recurring voltage pulses, commonly called clock pulses. Each unit of the circuit is capable of changing its state in response to an input condition, such as a voltage level, in such a way that an input condition occuring during any one clock pulse is indicated by the state of the unit during the next succeeding clock pulse. The input condition is, in effect, delayed by one clock pulse. In actual use, a number of units are cascaded so that an indication of the input condition is passed successively from unit to unit at the repetition rate of the clock pulses.

Various kinds of memory units such as briefly described above have been used. One well-known kind employs a small saturable magnetic core. This kind of unit has the disadvantage, for some purposes, that the output is a voltage pulse of short duration, that is, of a duration on the order of that of the clock pulse. Such a short duration signal is difficult to use directly because if an attempt be made to pass the signal to another component through a gate enabled by a clock pulse, serious synchronization problems arise. Accordingly, it is common practice to provide additional apparatus of some sort to convert the short duration output signal to a signal of longer duration.

Another well-known kind of memory unit is a flip-flop circuit. Such a unit is inherently capable of yielding an output signal having a long duration compared to the duration of a clock pulse. In fact, the output signal level is static, that is, constant until changed by a new input signal. Such an output signal can be applied directly to a gate enabled by a clock pulse, without synchronization problems. However, a flip-flop requires two valves, such as transistors or tubes, each of which costs money, takes up space, and dissipates power.

It is a general object of the present invention to provide an improved memory unit.

Another object is to provide a memory unit which yields an output having a duration long compared to the duration of a clock pulse.

Another object is to provide a memory unit requiring but a single transistor.

Briefly stated, the invention comprises, principally, first and second capacitors and one transistor. The output is a voltage level determined by the state of the transistor, conductive or nonconductive. In the absence of an input signal, both capacitors are in a substantially discharged condition while the transistor is conductive. The first capacitor is charged during the coincidence of an input signal and a clock pulse. At the end of the clock pulse, this charge is shared with the second capacitor. The circuit is such that the presence of a charge on the second capacitor renders the transistor nonconductive. The time constant is selected so that the second capacitor retains a substantial charge for a time interval longer than the repetition period of the clock pulses. Therefore, during the next clock pulse, the state of the transistor is indicative of whether an input signal occurred during the previous clock pulse.

For a clearer understanding of the invention, reference may be made to the following detailed description and the accompanying drawing, in which.

Figure 1:
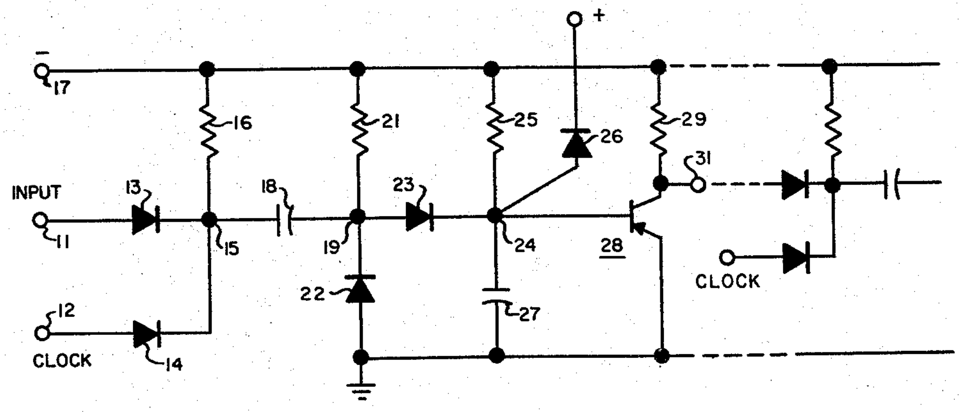
FIGURE 1 is a schematic diagram of a preferred embodiment of the invention.

Referring now to FIGURE 1, there are shown two terminals, 11 and 12, which are intended to be connected to an input signal and to a source of clock pulses respectively. These terminals are connected to the anodes of diodes 13 and 14 respectively, the cathodes of which are both connected to the junction 15. The junction 15 is connected through a resistor 16 to a source 17 of negative voltage and is also connected to one plate of a capacitor 18. The other plate of the capacitor 18 is connected to a junction 19 which in turn is connected through a resistor 21 to the source 17. The junction 19 is also connected to the cathode of a diode 22, the anode of which is grounded. The junction 19 is further connected to the anode of a diode 23, the cathode of which is connected to a junction 24. The junction 24 is connected through a resistor 25 to the source 17 and is also connected to the anode of a diode 26 the cathode of which is connected to a source of low positive voltage. A capacitor 27 is connected between the junction 24 and ground. A transistor 28 has its emitter grounded, its base connected to the junction 24, and its collector connected through a resistor 29 to the source 17. An output terminal 31 is connected to the collector of the transistor 28.

The above described apparatus constitutes one unit of a memory circuit. The output of the unit may be connected to the input of an identical, succeeding unit as shown.

Operation can be explained and understood most readily by assuming specific values. The unit shown was designed for use with an input signal of —10 volts or more and a 100 kc. clock pulse of —10 volts. Power supply was —28 volts.

At the start of operations the transistor 28 is conductive. Current flows from ground through the diodes 22 and 23 and the resistor 25 to the source 17. Since the diodes have some resistance in the forward direction, the voltage drop across them causes the potential of the junction 24 to fall slightly below ground. This small potential is sufficient to allow a base current to flow which renders the transistor 28 conductive.

Figure 2:
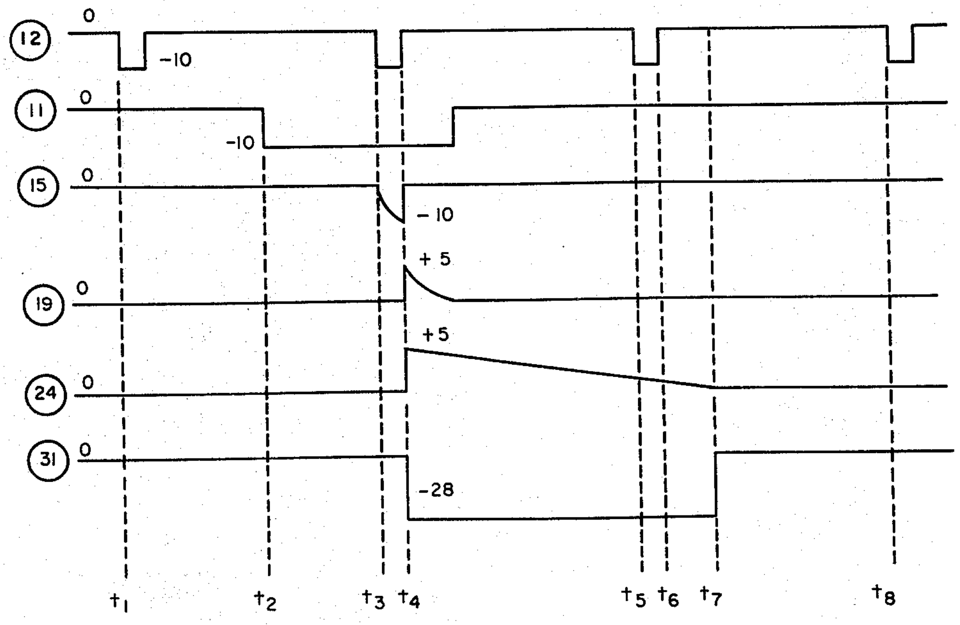
FIGURE 2 is a group of curves useful in explaining the invention.

FIGURE 2 shows the potential existing in various parts of the circuit during operation. In FIGURE 2, the small potential drop across the various diodes has been ignored. At the start, the potentials of junctions 12, 11, 15, 19, 24, and 31 are all substantially zero. At time $t_1$, a clock pulse arrives reducing the potential of the terminal 12 to —10 volts but since the terminal 11 is at ground potential, the junction 15 cannot fall below ground. No changes occur in the remainder of the circuit. At time $t_2$, an input signal reduces the potential of the terminal 11 to —10 volts but by this time the clock pulse has passed and the potential of the terminal 12 has returned to zero thereby holding the potential of the junction 15 to zero.

At the time $t_3$, another clock pulse arrives at the terminal 12 while the input signal is still present at the terminal 11. Accordingly, the potential of the junction 15 starts to fall, causing the capacitor 18 to be charged through the low resistance of the diode 22. The capacitor 18 charges quickly, as shown in FIGURE 2 by the potential of the junction 15, reaching substantially the full charge of 10 volts before the end of the clock pulse at time $t_4$. It is noted at this time that even if the input signal were greater in absolute value than −10 volts, such as −15, or −20, or up to −28 volts, the −10 volt level of the clock pulse would limit the potential on the junction 15 and the charge on the capacitor 18 to −10 volts.

At the time $t_4$, the clock pulse ends and the potentials of the terminal 12 and the junction 15 return suddenly to zero. The potential of the junction 19 rises, charging the capacitor 27 through the low resistance of the diode 23. If the capacitors 18 and 27 have the same capacitance, the charge on the capacitor 18 divides equally between the two capacitors, causing the potentials of the junctions 19 and 24 to rise quickly to +5 volts, as shown in FIGURE 2. Since the base of the transistor 28 is connected directly to the junction 24, the transistor 28 is cut off and the potential of the output terminal 31 falls to approximately −28 volts, the potential of the source 17. At the same time, the capacitors 18 and 27 start to discharge through the resistors 21 and 25 respectively. The resistor 21 is selected so that the capacitor 18 discharge well before the occurrence of the next clock pulse, returning the potential of the junction 19 to zero. The resistor 25 is selected so that the capacitor 27 discharges more slowly, retaining a substantial charge until after the passage of the next clock pulse at time $t_6$. Accordingly the transistor 28 remains cut off and the potential of the output terminal 31 remains at the −28 volt level during the next clock pulse interval (which is between time $t_5$ and time $t_6$) and for an appreciable time thereafter. Thus, an output voltage level is available which has a duration substantially in excess of the duration of a clock pulse so that this voltage may be applied to other apparatus through a gate enabled by a clock pulse without synchonization problems.

Eventually, at time $t_7$, the capacitor 27 becomes discharged and the potential of the junction 24 returns to its former value of zero (or, more accurately, to a potential slightly below ground because of the small resistance of the diodes 23 and 22 as previously discussed) thereby rendering the transistor 28 conductive and returning the potential of the output terminal 31 to zero. The time constant of the capacitor 27 and the resistor 25 (taking into consideration the voltage of the source 17) is not critical but need only be selected so that the capacitor 27 becomes substantially discharged sometime after the passage of the next succeeding clock pulse and before the occurrence of the next following clock pulse. In other words, the time constant is selected to make time $t_7$ occur between the time $t_6$ and the time $t_8$. Similarly, the time constant of the capacitor 18 and the resistor 21 is not critical, it only being necessary that the capacitor 19 become substantially discharged before the arrival of the next clock pulse, that is, before the time $t_5$.

The diode 26 has its anode connected to the junction 24 and its cathode connected to a five volt source of positive potential in order to prevent the potential of the junction 24 from rising above +5 volts. Stated more simply, the diode 26 clamps the junction 24 to +5 volts. This precaution is necessary because it is possible for an input signal to be applied during successive clock pulses. In FIGURE 2 it has been assumed that no input signal is present during the interval from $t_5$ to $t_6$. If there were an input signal at that time, the capacitor 18 would be charged at the time $t_5$ and at the time $t_6$ would share its charge with the capacitor 27, which would be already partially charged. In the absence of the diode 26, the charge on the capacitor 27 would exceed 5 volts. The occurrence of an input signal during several successive clock pulses could cause the capacitor 27 to be charged to +8 or +9 volts. If such a charge occurred at time $t_4$ in FIGURE 2, the capacitor 27 might remain partially charged until after the time $t_8$ thereby causing erroneous operation. The diode 26 prevents such erroneous operation by limiting the potential of the junction 24 to +5 volts.

An embodiment of the invention as described in connection with FIGURE 1 has been constructed and found highly satisfactory. It was designed for use with clock pulses having an amplitude of −10 volts and repetition frequency of 100 kilocycles per second. The following parameters were used.

| | |
|---|---|
| Input signal | −10 to −28 volts. |
| Source 17 | −28 volts. |
| Bias for diode 26 | +5 volts. |
| Resistor 16 | 5,000 ohms. |
| Resistor 21 | 15,000 ohms. |
| Resistor 25 | 100,000 ohms. |
| Resistor 29 | 2,700 ohms. |
| Capacitors 18 and 27 | 1,000 $\mu\mu f$. |
| Transistor 28 | Type 2N 404. |

It will be understood that the above parameters are merely illustrative and that other values may be used to meet other operating conditions.

There has been described in connection with FIGURE 1 a single unit capable of remembering one "bit" of information. In most practical applications several units will be required. FIGURE 1 shows a few components of an identical succeeding unit with the output on the terminal 31 constituting the input signal for the second unit. Obviously an "$n$" bit delay can be provided by cascading "$n$" stages. Additionally, if the output of the last of the "$n$" stages be returned to the input, an "$n$" bit recirculatory register is formed. Information inserted into such a register will reside there and may be read out at any time.

Although a specific embodiment has been described for illustrative purposes, many modifications will occur to those skilled in the art. It is therefore desired that the protection afforded by Letters Patent be limited only by the true scope of the appended claims.

What is claimed is:

1. A memory circuit, comprising,
a series of clock pulses,
a first terminal for receiving said series of clock pulses,
a second terminal for receiving said input voltage signal,
a first capacitor having first and second plates,
a ground conductor,
a first diode interconnecting said first plate of said first capacitor and ground,
circuit means interconnecting said first and second terminals and said second plate of said first capacitor for charging said first capacitor only upon simultaneous receipt of an input signal and a clock pulse,
a second capacitor having first and second plates,
a direct connection between said first plate of said second capacitor and said ground conductor,
circuit means including a second diode coupled between said first plate of said first capacitor and said second plate of said second capacitor for providing a charge path for transferring a portion of the charge on said first capacitor to said second capacitor only upon termination of said clock pulse,
a first discharge path including a resistance coupled to said second plate of said first capacitor and having a time constant which is short compared to the interval between clock pulses,
a discharge path for said second capacitor providing a time constant sufficiently long to hold a substantial charge on said second capacitor for a time interval in excess of the repetition period of said clock pulses,
an output conductor, and
means interconnecting said second plate of said second capacitor and said output conductor for switching the potential of said output conductor between two predetermined magnitudes in response to the presence or absence of a charge on said second capacitor.

2. Apparatus according to claim 1 in which said last named means comprises a transistor biased to be normally conductive and rendered nonconductive by the presence of a charge on said second capacitor.

References Cited by the Examiner

UNITED STATES PATENTS 2,946,020 7/60 Hudson ---------------- 328—186

JOHN W. HUCKERT, *Primary Examiner.*

DAVID J. GALVIN, ARTHUR GAUSS, *Examiners.*